(12) United States Patent
Borja et al.

(10) Patent No.: US 12,384,727 B2
(45) Date of Patent: Aug. 12, 2025

(54) COMPOSITE COMPONENTS AND METHODS FOR PREVENTING FLOW FROM INFILTRATED COMPONENT DURING RE-INFILTRATION

(71) Applicant: General Electric Company, Schenectady, NY (US)

(72) Inventors: Juan P. Borja, Latham, NY (US); Daniel Gene Dunn, Guilderland, NY (US); Jared Hogg Weaver, Clifton Park, NY (US); Anant Achyut Setlur, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 264 days.

(21) Appl. No.: 17/851,269

(22) Filed: Jun. 28, 2022

(65) Prior Publication Data
US 2023/0416162 A1 Dec. 28, 2023

(51) Int. Cl.
*C04B 37/00* (2006.01)
*B32B 18/00* (2006.01)
(Continued)

(52) U.S. Cl.
CPC ............ *C04B 37/003* (2013.01); *B32B 18/00* (2013.01); *F01D 5/282* (2013.01); *F01D 25/005* (2013.01); *C04B 2237/16* (2013.01); *C04B 2237/38* (2013.01); *C04B 2237/61* (2013.01); *C04B 2237/84* (2013.01); *F05D 2220/32* (2013.01); *F05D 2230/20* (2013.01);
(Continued)

(58) Field of Classification Search
CPC ............ C04B 37/003; C04B 2237/16; C04B 2237/38; C04B 2237/84; B32B 18/00; F05D 2300/6033
See application file for complete search history.

(56) References Cited

U.S. PATENT DOCUMENTS 6,820,334 B2 11/2004 Kebbede et al.
7,966,707 B2 6/2011 Szela et al.
(Continued)

OTHER PUBLICATIONS

Marchais et al., Capillary Infiltration of Hexadecane in Packed SiC Powder and in SiC/SiC Preforms: Pore Description and Calculation of Molten Si Infiltration, Ceramics International, vol. 42, 2016, pp. 7774-7780.

*Primary Examiner* — Daniel McNally
(74) *Attorney, Agent, or Firm* — Dority & Manning, P.A.

(57) ABSTRACT

A method for modifying a composite component may include positioning a barrier segment between an infiltrated segment of the composite component and a green segment to form an assembly; and initiating an infiltration process. The barrier segment may have a barrier segment permeability that is lower than a permeability of the infiltrated segment, a permeability of the green segment, or both. A composite component may include an infiltrated segment infiltrated with a molten material during a prior infiltration process; a green segment that is uninfiltrated; and a barrier segment having a microstructure different from the infiltrated segment, the green segment, or both. The microstructure of the barrier segment may be configured to slow a flow of material between the infiltrated segment and the green segment during a subsequent infiltration process.

19 Claims, 4 Drawing Sheets

(51) Int. Cl.
*F01D 5/28* (2006.01)
*F01D 25/00* (2006.01)

(52) U.S. Cl.
CPC ...... *F05D 2240/12* (2013.01); *F05D 2240/30* (2013.01); *F05D 2300/6033* (2013.01)

(56) References Cited

U.S. PATENT DOCUMENTS

| | | |
|---|---|---|
| 9,366,140 B2 | 6/2016 | Chamberlain |
| 10,150,188 B1 | 12/2018 | Parolini et al. |
| 10,384,981 B2 | 8/2019 | Hall et al. |
| 10,597,335 B2 | 3/2020 | Dunn et al. |
| 10,774,008 B2 | 9/2020 | Subramanian et al. |
| 10,774,648 B2 | 9/2020 | Roberts et al. |
| 11,027,529 B2 | 6/2021 | Nelson et al. |
| 11,034,106 B2 | 6/2021 | Mega et al. |
| 2006/0006212 A1 | 1/2006 | Thebault et al. |
| 2006/0188736 A1 | 8/2006 | Luthra et al. |
| 2019/0084892 A1* | 3/2019 | Subramanian .... C04B 35/62844 |
| 2019/0376389 A1 | 12/2019 | Roberts et al. |
| 2020/0189143 A1 | 6/2020 | Brandt et al. |
| 2020/0199028 A1 | 6/2020 | Dunn et al. |

* cited by examiner

FIG. -1-

COMPOSITE COMPONENTS AND METHODS FOR PREVENTING FLOW FROM INFILTRATED COMPONENT DURING RE-INFILTRATION

FIELD

The present subject matter relates generally to composite components. More particularly, the present subject matter relates to composite components and methods for modifying composite components to prevent flow of constituent materials from a previously infiltrated component to green, uninfiltrated material during an infiltration process.

BACKGROUND

Reinforced ceramic matrix composites ("CMCs") comprising fibers dispersed in continuous ceramic matrices of the same or a different composition are well suited for structural applications because of their toughness, thermal resistance, high-temperature strength, and chemical stability. Such composites typically have high strength-to-weight ratio that renders them attractive in applications in which weight is a concern, such as in aeronautic applications. Their stability at high temperatures renders CMCs very suitable in applications in which components are in contact with a high-temperature gas, such as in a gas turbine engine.

CMCs may be formed from various materials using various methods, including methods that include infiltrating a matrix with an infiltration material such as silicon. From time to time, a previously infiltrated, original CMC component may be damaged such that a repair is needed, or the infiltrated CMC component may otherwise require reworking or modification, and green or uninfiltrated CMC material may be used to require or otherwise modify the original CMC component. For example, the green, uninfiltrated material may be laid up with the original CMC component and then subjected to infiltration, e.g., to reduce porosity and strengthen the green material. However, during such infiltration of the green material, free silicon or other constituents in the original CMC component could migrate from the original CMC component to the green material, which could weaken the original CMC component portion of the resulting CMC component.

Accordingly, improved methods for modifying CMCs and other composites would be desirable.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION

Figure 1:
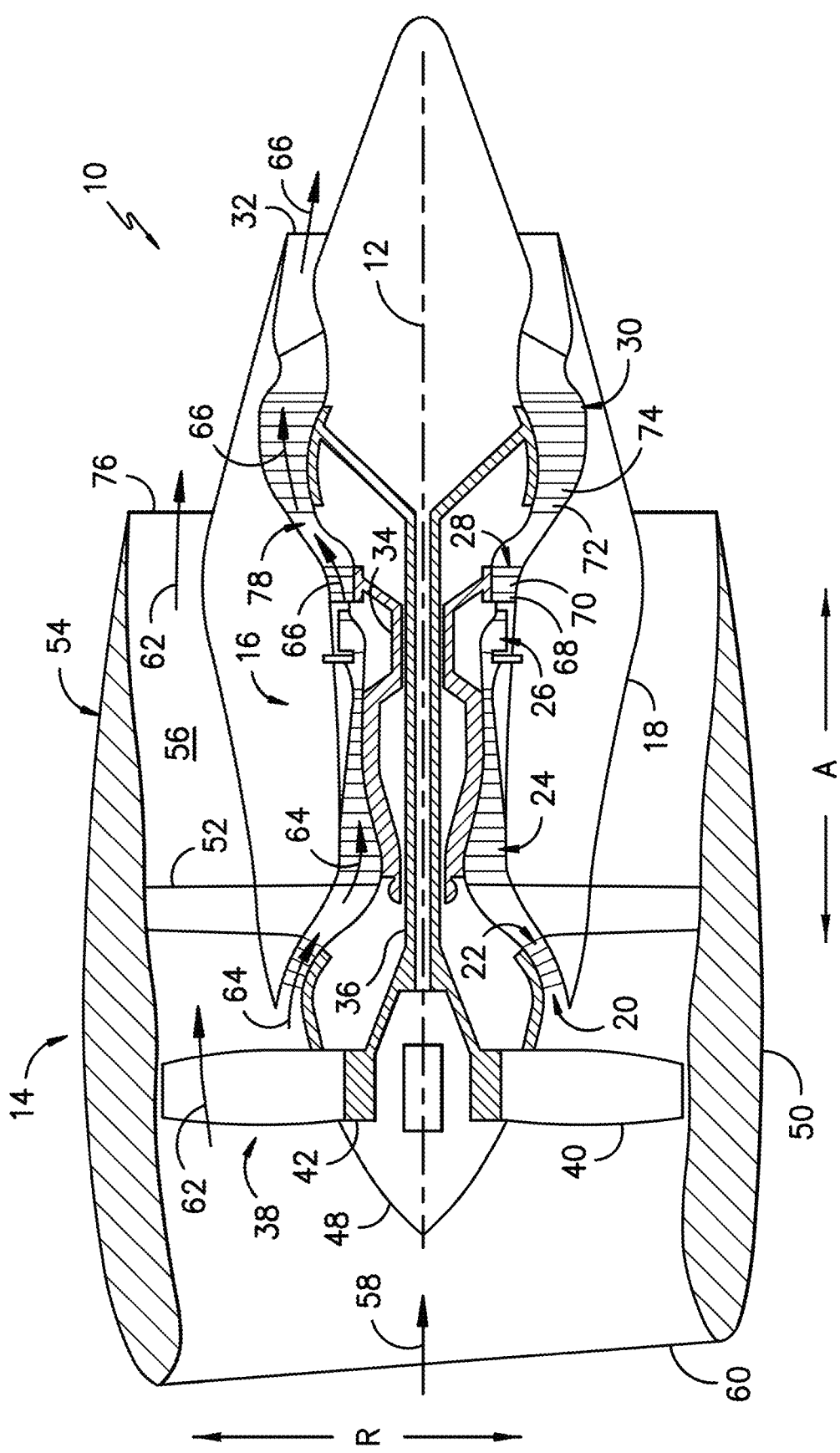
FIG. 1 provides a schematic cross-section view of a gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosed embodiments.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "permeability" refers to the ease with which a fluid phase under pressure (e.g., capillary pressure) can flow through a porous domain. Permeability of a material can be dictated by the size of particles, continuity and size of voids or channels, and/or geometrical attributes of the pore network in the microstructure of the material. Assuming a homogeneous arrangement of spherical particles in a material's microstructure, permeability K may be represented by Equation 1:

$$K = \frac{\varphi^3}{k_0 T^2 (1-\varphi)^2} D_m^2 \tag{Eq. 1}$$

where $\varphi$ is porosity, $k_0$ is a shape factor, T is tortuosity, and $D_m$ is the average particle size. Shape factor is often introduced into permeability expressions to reconcile transport phenomena in real systems from an idealized arrangement of pores with underlying repeating geometrical pattern. For example, a shape factor of 1 is often used for slit shaped pores, 1.4 for a randomly packed spherical pores, 2 for cylindrical channels, and 3 for spherical pores in ordered fashion. The average particle size $D_m$ may be, e.g., the median particle diameter D50, which splits the particle diameter distribution such that half of the particles have a diameter below the median particle diameter D50 and half of the particles have a diameter above the median particle diameter D50. Using other values within a particle size distribution may provide, e.g., upper and lower bounds for the permeability of a material. For example, a diameter D90 indicates 90% of particles within the material have diameters below or smaller than the diameter D90, and a diameter D10 indicates 10% of particles within the material have diameters below or smaller than the diameter D10. As such, D90 may be used to determine an upper bound for permeability of a material and D10 may be used to determine a lower bound for permeability of the material.

The term "reactive permeability" refers to the effective permeability of the microstructure of a material upon local reaction between a starting porous scaffold of the material and infiltrating fluid phase. The reactive permeability can be different from the permeability of the starting porous scaffold due to, e.g., volumetric changes arising from the solid phases originating from the formation of reaction products during infiltration.

The term "green state" refers to a porous scaffold that has not undergone fluid infiltration and subsequent reaction.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 5, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides composite components and methods for modifying composite components. For instance, the present subject matter provides a method of modifying a composite component after an initial infiltration process, where green, uninfiltrated material is added to the already-infiltrated composite component. More particularly, an assembly including an infiltrated segment, a green segment, and a barrier segment is subjected to an infiltration process such that the infiltrated segment of the assembly undergoes a second or subsequent infiltration. Without the barrier segment, one or more constituents of the infiltrated segment could migrate or be redistributed from the already infiltrated segment of the assembly to the uninfiltrated green segment, which could cause voids, cracks, or other undesirable elements in the already infiltrated segment. The barrier segment has a lower permeability, e.g., through a different microstructure, than one or both of the infiltrated segment and the green segment to slow or prevent migration or redistribution of material from the infiltrated segment to the green segment during infiltration of the assembly. For example, the barrier segment arrests the flow of one or more constituents, such as silicon for CMC components, from the already infiltrated segment of the assembly by creating a drop in permeability that lowers pore velocity across an interface between the already infiltrated segment and the green segment. As such, flow into the green segment during infiltration would have to originate from a source external to the assembly, e.g., flow from a source of silicon positioned in contact with the green segment during the infiltration process.

Referring now to the drawings, wherein identical numerals indicate the same elements throughout the figures, FIG. 1 is a schematic cross-sectional view of a gas turbine engine in accordance with an embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal centerline 12 by LP spool 36. In some embodiments, a power gear box having a plurality of gears may be included for stepping down the rotational speed of the LP spool 36 to a more efficient rotational fan speed.

Referring still to the embodiment of FIG. 1, disk 42 is covered by rotatable front nacelle 48 aerodynamically contoured to promote an airflow through the plurality of fan blades 40. Additionally, the fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan engine 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a ceramic matrix composite (CMC) material, which has high temperature capability. As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \, 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Figure 2:
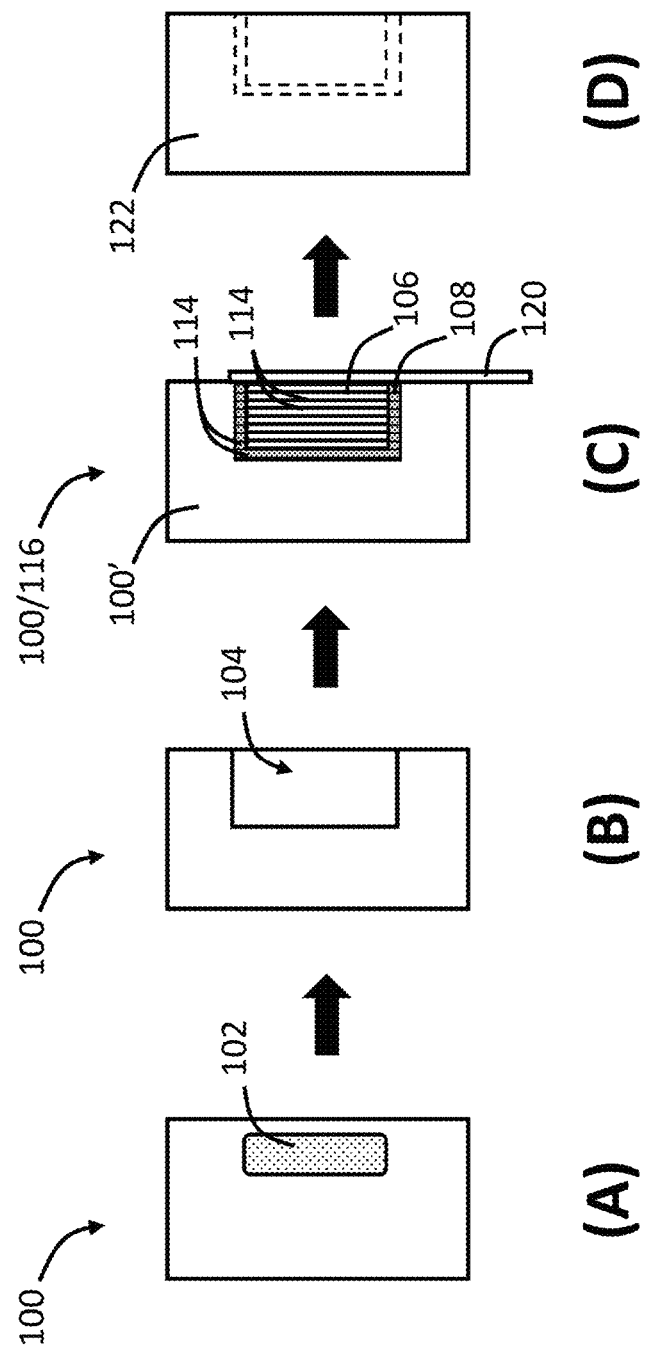
FIG. 2 provides schematic cross-section views of an infiltrated component undergoing modification, including identification and removal of unwanted material, addition of a barrier segment and a green segment, and subsequent infiltration.

Turning to FIG. 2, a composite component 100 of a gas turbine engine, such as turbofan engine 10, will be described according to an embodiment of the present subject matter. As schematically illustrated in FIG. 2, the composite component 100 may be a composite airfoil such as a turbine stator nozzle airfoil. In other embodiments, the composite component 100 may be another composite airfoil, such as an inlet guide vane (IGV), an outlet guide vane (OGV) 52, a rotor blade, etc. or other composite component such as a combustor liner, a fan case, a shroud, a frame, etc.

As described above, forming the composite component 100 includes processing a cured preform, e.g., by subjecting the cured preform to infiltration with a material such as silicon to achieve a desired chemical composition and/or to densify the cured preform. Sometimes, after a composite component 100 is formed, the composite component 100 may undergo refurbishing, repair, restructuring, or other re-working or modification. For example, the composite component 100 may require re-working before it is fielded (e.g., to meet a new specification, to correct a manufacturing error, etc.), and the re-working includes incorporating new material into the existing, infiltrated composite component 100.

As another example, after a certain period of use or after an event in which the turbofan engine 10 and/or the composite component 100 is damaged, a portion of the composite component 100 may need to be replaced with new material. Referring to FIG. 2, as shown at (A), an area 102 of damaged or unwanted material is identified and, as shown at (B), is removed from the infiltrated composite component 100 to leave an opening 104, such as a void, cavity, or the like, in the composite component 100. For instance, the area 102 of damaged or unwanted material may be scarfed or otherwise cleaned out of the composite component 100.

Figure 3:
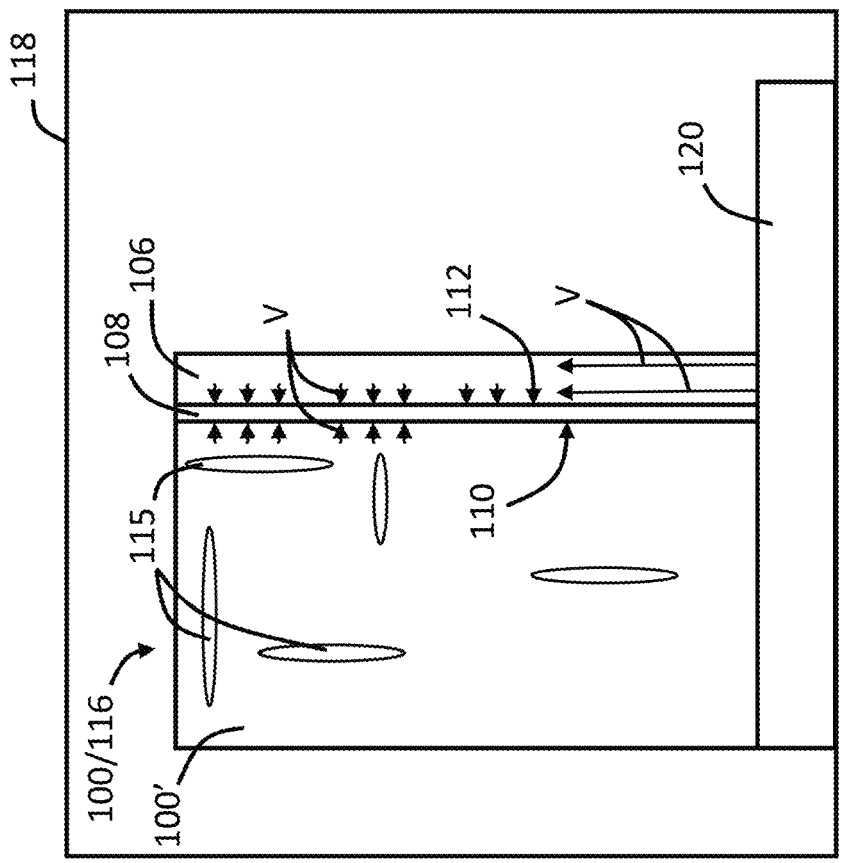
FIG. 3 provides a schematic cross-section view of an assembly including an infiltrated segment, a barrier segment, and a green segment positioned in contact with a source of silicon and disposed in a furnace.

Referring to (C) in FIG. 2 and to FIG. 3, whether filling an opening 104 to repair a damaged composite component 100 or otherwise modifying a composite component 100 with new material, a green segment 106 of composite material is laid up with or positioned with an infiltrated segment 100' of the composite component 100. Further, a barrier segment 108 is positioned between the infiltrated segment 100' and the green segment 106 such that the barrier segment 108 is in contact with both the infiltrated segment 100' and the green segment 106. As shown at (C) in FIG. 2, the barrier segment 108 lines the interface between the existing, infiltrated segment 100' and the new, green segment 106 of composite material. For example, as shown in FIG. 3, the barrier segment 108 defines a first interface surface 110 that contacts the infiltrated segment 100' and a second interface surface 112 that contacts the green segment 106. When laid up or positioned together as shown at (C) in FIG.

2 and in FIG. 3, the infiltrated segment 100', the green segment 106, and the barrier segment 108 define an assembly 116.

In some embodiments, the green segment 106 comprises the barrier segment 108. For example, the green segment 106 and the barrier segment 108 may be formed from a plurality of composite plies 114, with the barrier segment 108 being at least one ply of the plurality of composite plies 114 that together form the green segment 106 and barrier segment 108, and the composite ply or plies 114 forming the barrier segment 108 having at least one property that is different from the plurality of composite plies 114 forming the green segment 106, as described in greater detail below. In such embodiments, the plurality of composite plies 114 are stacked or laid up together, e.g., as a composite ply layup, and the plurality of plies 114 of the barrier segment 108 define the first interface surface 110 contacting the infiltrated segment 100'. The plurality of composite plies 114 may be prepreg plies, e.g., as described above, in some embodiments, bundles of fibers may be formed as a reinforced tape and impregnated with a slurry composition prior to being laid up as a preform, where the slurry impregnated tape may be referred to as "prepreg" and finite lengths of the tape may be referred to as "plies." In other embodiments, the green segment 106 and/or the barrier segment 108 may be formed by any other suitable process, such as a slurry cast process, etc., resulting in a composite preform comprising reinforcing fibers disposed in a matrix.

The barrier segment 108 between the infiltrated segment 100' and the green segment 106 helps retard or prevent a flow of free or residual silicon and/or other constituents from the original, already-infiltrated segment 100' to the green segment 106, e.g., during an infiltration process to infiltrate the green segment 106. That is, the barrier segment 108 may be used to limit, hinder, and/or avoid fluid transport across adjacent bodies, such as the infiltrated segment 100' and the green segment 106. For instance, where the composite component 100 is a CMC component and the infiltrated segment 100' and the green segment 106 are each formed from a CMC material, the barrier segment 108 forms a barrier to prevent loss of or reflow of silicon and/or other constituents, e.g., from pockets 115 of unreacted silicon in the infiltrated segment 100', as shown in FIG. 3, to the green segment 106 during a subsequent infiltration. More particularly, during the subsequent infiltration, which may be a melt infiltration (MI), chemical vapor infiltration (CVI), etc. or a combination thereof, a temperature above the melting point of silicon may be applied. Without the barrier segment 108, the green segment 106 is positioned against the original, infiltrated segment 100', and residual silicon present in the infiltrated segment 100' may melt at the higher temperatures the component is exposed to during the subsequent or second infiltration. The melted silicon may be pulled into fine capillaries of the added, newly formed "green" CMC material by capillary action. Upon cooling, such silicon may remain in the green CMC portion, leaving voids, fissures, cracks, pores, or other undesirable elements in the infiltrated segment 100' of the final composite component 100 formed from the infiltrated segment 100' and the green segment 106.

As mentioned above, the barrier segment 108 positioned between the infiltrated segment 100' and the green segment 106 is different from the infiltrated segment 100', the green segment 106, or both to slow, limit, hinder, or prevent the migration of constituents from the infiltrated segment 100' to the green segment 106 during an infiltration process in which the previously infiltrated segment 100' and the green segment 106 are simultaneously exposed to infiltration conditions. For example, at least one property of the barrier segment 108 may be different from a respective at least one property of the green segment 106 and/or the infiltrated segment 100'.

In at least some embodiments, the barrier segment 108 has a barrier segment permeability $K_{barrier}$ that is lower than an infiltrated segment permeability $K_{infiltrated}$ of the infiltrated segment 100', a green segment permeability $K_{green}$ of the green segment 106, or both the infiltrated segment permeability $K_{infiltrated}$ and the green segment permeability $K_{green}$. For example, a lower barrier segment permeability $K_{barrier}$ of the barrier segment 108 at the interface between the infiltrated segment 100' and the green segment 106 causes the local fluid velocity to drop across the interface, which hinders reflow caused by local capillary forces. In some embodiments, the barrier segment permeability $K_{barrier}$ may be one-half (½) or less of the green segment permeability $K_{green}$. As examples, the infiltrated segment permeability $K_{infiltrated}$ and the green segment permeability $K_{green}$ may each be within a range of about $1 \times 10-4$ $m^2$ to about $1 \times 10^{-12}$ $m^2$, and the barrier segment permeability $K_{barrier}$ may be within a range of about $1 \times 10^{-18}$ $m^2$ to about $1 \times 10^{-15}$ $m^2$. The range of green segment permeability $K_{green}$ was measured through a capillary weight-gain procedure similar to a procedure using isopropanol as the infiltrant reported in the article by A. Marchais, et al., "Capillary infiltration of hexadecane in packed SiC powder and in SiC/SiC preforms: Pore description and calculation of molten Si infiltration," Ceramics International, vol. 42, pp. 7774-7780 (2016).

The lower barrier segment permeability $K_{barrier}$ of the barrier segment 108, which may be one or more composite plies 114 or a composite preform formed in another suitable manner as described above, may result from the microstructure of the barrier segment 108. For instance, the microstructure of the barrier segment 108 may be different from the microstructure of the infiltrated segment 100', the green segment 106, or both to control the transport of silicon or other constituents from the infiltrated segment 100' to the green segment 106 during an infiltration process. The microstructure of the barrier segment 108 resulting in a lower barrier segment permeability $K_{barrier}$ compared to the infiltrated segment permeability $K_{infiltrated}$ of the infiltrated segment 100' and/or the green segment permeability $K_{green}$ of the green segment 106 can cause a velocity field drop or pressure field discontinuity across a flow path from the infiltrated segment 100' to the green segment 106, thus slowing or preventing the flow of constituents such as silicon from the infiltrated segment 100' to the green segment 106.

For example, the barrier segment permeability $K_{barrier}$ correlates to the flow velocity through the barrier segment 108, e.g., a 10% drop in the barrier segment permeability $K_{barrier}$ may correspond to a 10% drop in flow velocity through the barrier segment 108. As such, a lower barrier segment permeability $K_{barrier}$ relative to the infiltrated segment permeability $K_{infiltrated}$ and/or the green segment permeability $K_{green}$ may be selected to sufficiently lower the flow velocity through the barrier segment 108 to reduce or prevent reflow from the infiltrated segment 100' to the green segment 106 during an infiltration process. For instance, referring particularly to FIG. 3, the arrows V represent velocity vectors of the flow of free silicon, with the length of each arrow representing a magnitude of the flow velocity. As shown in FIG. 3, flow along a y-axis, which is the main axis or dominant velocity in the depicted embodiment, is of a greater magnitude than flow along an x-axis, which is through the thickness of the component. That is, the arrows V extending along or parallel to the y-axis have a greater length than the arrows V extending along or parallel to the x-axis. Accordingly, the magnitude of the flow velocity from the infiltrated segment 100' and the green segment 106 to the barrier segment 108 are smaller than the magnitude of the flow velocity from a source of silicon 120 to the green segment 106, which indicates the barrier segment 108 has a lower permeability than at least the green segment 106 for the embodiment depicted in FIG. 3.

In at least some embodiments, the barrier segment permeability $K_{barrier}$ may be lower than the green segment permeability $K_{green}$ based at least in part on the cycle time for infiltrating the assembly 116 including the infiltrated segment 100', the green segment 106, and the barrier segment 108 (which may be referred to as a re-infiltration process because the infiltrated segment 100' is undergoing a second or further infiltration process). For example, in some embodiments, a ratio of the green segment permeability $K_{green}$ to the barrier segment permeability $K_{barrier}$ may be greater than 2:1, scaled by a time scale factor derived from the time scale of silicon transport in the barrier segment 108 and the cycle time for infiltrating the assembly 116. The ratio between the green segment permeability $K_{green}$ and the barrier segment permeability $K_{barrier}$ may be expressed as shown in Equation 2:

$$K_{barrier} < 0.5 K_{green} \frac{t_0}{t_{process}} \quad \text{(Eq. 2)}$$

where the time scale factor $t_0/t_{process}$ is the ratio of the time scale to of silicon transport in the barrier segment 108 to the cycle time $t_{process}$ of the infiltration of the assembly 116. In some embodiments, the ratio of green segment permeability $K_{green}$ to the barrier segment permeability $K_{barrier}$ may be greater than 4:1, in some embodiments greater than 5:1, in some embodiments greater than 10:1, in some embodiments greater than 20:1, in some embodiments greater than 50:1, and in some embodiments greater than 100:1, with each ratio scaled by the time scale factor as described above. Stated differently, in various embodiments, the barrier segment permeability $K_{barrier}$ may be within the following range, scaled by the time scale factor as shown in Equation 2:

$$0.01 K_{green} \leq K_{barrier} \leq 0.75 K_{green}$$

As described in greater detail below, the barrier segment permeability $K_{barrier}$ may be lower than the green segment permeability $K_{green}$ because the microstructure of the barrier segment 108 is different than the microstructure of the green segment 106. For instance, to differentiate the microstructure of the barrier segment 108 from the microstructure of the barrier segment 108, the particle size distribution of the barrier segment 108 may be different from the particle size distribution of the green segment 106 and/or the free silicon content of the barrier segment 108 may be different from the free silicon content of the green segment 106, either or both of which may affect the porosity of the barrier segment 108 and, thereby, its permeability.

The microstructure of the barrier segment 108 may be modified relative to the microstructure of the infiltrated segment 100' and/or the green segment 106 in a variety of ways. As an example, the particle size distribution may vary between the barrier segment 108 and the infiltrated segment 100' and/or the green segment 106 to produce a different microstructure in the barrier segment 108. For example, the particle size distribution may vary such that the green segment 106 includes larger particles and the barrier segment 108 includes smaller particles. Further, the particle size distribution may vary within the barrier segment 108, with the largest particles in the barrier segment 108 distributed closer to the first interface surface 110 defining the interface between the barrier segment 108 and the infiltrated segment 100' and the smallest particles in the barrier segment 108 distributed farthest from the first interface surface 110, such that, e.g., the average particle size within the barrier segment 108 decreases from the first interface surface 110 toward the second interface surface 112 between the barrier segment 108 and the green segment 106.

The particle size distribution affects the number and size of pores formed in a material, and the porosity of the material indicates its permeability. Thus, changing the particle size distribution of the barrier segment 108 relative to the infiltrated segment 100' and/or the green segment 106, and/or changing the particle size distribution within the barrier segment 108, changes the pore size and distribution and, therefore, the barrier segment permeability $K_{barrier}$ of the barrier segment 108 relative to the infiltrated segment permeability $K_{infiltrated}$ of the infiltrated segment 100', the green segment permeability $K_{green}$ of the green segment 106, or both and/or relative to the permeability through the barrier segment 108. As such, a pore size distribution within the barrier segment 108 can be selected to achieve a lower permeability in the barrier segment 108 relative to the infiltrated segment 100' and/or the green segment 106.

As an example, a typical CMC material, from which the segment 100' and the green segment 106 may be formed, may have a median particle size of about 1 micron. A barrier segment 108 may have a modified particle size distribution compared to the infiltrated segment 100' and the green segment 106 that shifts the median particle size toward about 0.5 microns. As may be determined using, e.g., Equation 1, reducing the median particle size from about 1 micron to about 0.5 microns results in an approximately four time (4X) reduction in the barrier segment permeability $K_{barrier}$ compared to the infiltrated segment permeability $K_{infiltrated}$ and the green segment permeability $K_{green}$. For example, using Equation 2 described above, reducing the median particle size from about 1 micron in the green segment 106 to about 0.5 microns in the barrier segment 108 results in a barrier segment permeability $K_{barrier}$ of approximately one-quarter (¼) of the green segment permeability $K_{green}$, or $K_{barrier} \leq 0.25 K_{green}$. As a further example, reducing the median particle size from about 1 micron in the green segment 106 to about 0.1 microns in the barrier segment 108 results in a barrier segment permeability $K_{barrier}$ of approximately one-tenth (1/10) of the green segment permeability $K_{green}$, or $K_{barrier} \leq 0.1 K_{green}$.

As another example of modifying the microstructure of the barrier segment 108, a residual porosity of the barrier segment 108 may be reduced relative to a residual porosity of the infiltrated segment 100' and/or the green segment 106 to lower the permeability of the barrier segment 108 relative to the infiltrated segment 100' and/or the green segment 106. For instance, during a melt infiltration process, residual channels or voids may be filled with silicon such that a fully reacted baseline MI-CMC component has a residual silicon volume content, which can be considered residual porosity that has been accessed by liquid silicon at the end of infiltration. Based on Equation 1, decreasing the residual porosity of a material can reduce or lower the permeability of the material.

Modifications of a mass fraction ratio of silicon carbide to carbon (SiC to C) particles in a CMC material can be used to increase or reduce the residual porosity. For example, increasing the content or mass fraction of carbon particles relative to the mass fraction of silicon carbide can reduce the residual porosity of the CMC material. For instance, using Equation 1, reducing the residual porosity from about 13% to about 5% by increasing the carbon content results in a 21× reduction in permeability, i.e., the permeability of a material with an approximately 5% residual porosity due to an increased carbon content is 21 times lower than the permeability of a material with an approximately 13% residual porosity. For example, referring to Equation 2, reducing the free silicon content in the barrier segment 108 (e.g., by increasing the carbon content) from about 13% to about 8.5% can lower the barrier segment permeability $K_{barrier}$ to one-quarter (¼) or less of the green segment permeability $K_{green}$, such that $K_{barrier} \leq 0.25 K_{green}$. As another example, reducing the free silicon content in the barrier segment 108 from about 13% to about 6.5% can lower the barrier segment permeability $K_{barrier}$ to one-tenth (⅒) or less of the green segment permeability $K_{green}$, such that $K_{barrier} \leq 0.1 K_{green}$. Thus, reducing the residual porosity or amount of free silicon in the barrier segment 108, such as by increasing the content of carbon particles in the barrier segment 108 relative to the carbon content of the infiltrated segment 100' and/or the green segment 106, can lower the barrier segment permeability $K_{barrier}$ relative to the infiltrated segment permeability $K_{infiltrated}$ and/or the green segment permeability $K_{green}$.

In at least some embodiments, the lower permeability of the barrier segment 108 may be a lower reactive permeability. The reactive permeability of the infiltrated segment 100', the green segment 106, and/or the barrier segment 108 may be different from the permeability of the starting porous of the respective segment 100', 106, 108 and due to, e.g., volumetric changes arising from solid phases that originate from the formation of reaction products during infiltration. For example, when the lower permeability is a lower reactive permeability, the barrier segment permeability $K_{barrier}$ is lower when the barrier segment 108 reacts during the infiltration process due to a reduction in porosity arising from the formation of reaction products during infiltration. For instance, the barrier segment permeability $K_{barrier}$ may be lower as an environmental temperature of the assembly 116 including the infiltrated segment 100', the green segment 106, and the barrier segment 108 is raised, e.g., where the assembly 116 is disposed in a furnace 118 (FIG. 3) and the environmental temperature within the furnace 118 is raised above the melting point of silicon as described below. As such, the reactive permeability of the barrier segment 108 may be lower than a reactive permeability of the infiltrated segment 100' and/or the green segment 106 to slow or prevent reflow from the infiltrated segment 100' to the green segment 106 during an infiltration process.

Further, the barrier segment 108 can be tuned depending on, e.g., the infiltrated segment 100' and/or the green segment 106. That is, the local fluid velocity at the interface between the infiltrated segment 100' and the green segment 106 can be tuned to be a desired fluid velocity for a given assembly 116. As one example, the barrier segment permeability $K_{barrier}$ of the barrier segment 108 may vary one assembly 116 to another based on the composition of the barrier segment 108, e.g., by varying a particle size distribution in a first barrier segment 108 compared to a particle size distribution of a second barrier segment 108, or by otherwise creating a different microstructure in different barrier segments 108.

By utilizing a lower permeability in the barrier segment, e.g., through altering the microstructure of the barrier segment compared to the infiltrated segment 100' and the green segment 106, undesired flow from the infiltrated segment 100' to the green segment 106 during infiltration can be slowed or prevented without using different materials and/or chemical changes or treatments. For instance, the green segment 106 and the barrier segment 108 can be formed from the same material as the infiltrated segment 100' (e.g., a CMC material such as SiC/SiC), with the barrier segment 108, formed from the same material, having a different microstructure to lower the barrier segment permeability $K_{barrier}$ relative to the infiltrated segment permeability $K_{infiltrated}$ and/or the green segment permeability $K_{green}$. By leveraging microstructure to arrest or prevent reflow from the infiltrated segment 100', there is no need to add different materials and/or chemical changes/treatment into the process and assembly 116. Thus, the lower barrier segment permeability $K_{barrier}$ may be achieved by taking advantage of interfacial dynamics, which may lessen any potential divergence between the material of the existing, infiltrated segment 100' and the material of the new, green segment 106.

Referring to (C) in FIG. 2 and to FIG. 3, the green segment 106 containing the fibers and matrix constituents is formed and positioned with respect to the infiltrated segment 100' such that at least a portion of the barrier segment 108 is disposed at all locations where, without the barrier segment 108, the green segment 106 would interface with the infiltrated segment 100'. That is, the infiltrated segment 100', the green segment 106, and the barrier segment 108 are assembled or laid up together as assembly 116 with barrier segment 108 separating the green segment 106 from the infiltrated segment 100'. As illustrated in FIGS. 2 and 3, the barrier segment 108 may have any appropriate shape and/or may consist of any appropriate number and configuration of portions or regions to form a barrier between the infiltrated segment 100' and the green segment 106.

After the infiltrated segment 100', the green segment 106, and the barrier segment 108 are assembled together as assembly 116, the green segment 106 is heated while in contact with, e.g., for CMC components, a source of silicon (Si) 120 such as a source of silicon metal or alloy. Heating the green segment 106 while in contact with the source of silicon 120 produces a ceramic matrix when reacting with the matrix constituents. The molten infiltrating silicon phase readily wets the matrix constituents (e.g., SiC and/or carbon matrix constituents) of the green segment 106 and, therefore, is easily pulled into a portion of the porosity of the green segment 106 by capillary action. Typically, no external driving force is needed for the infiltration of silicon into the matrix constituents and there is typically no dimensional change of the preform forming the green segment 106 as a result of the infiltration (as the porosity of the preform is filled with silicon). Current conventional processes for melt infiltration (MI) of fiber-reinforced CMCs using silicon (e.g., silicon metal or alloy) include batch processes where either silicon metal powder may be applied onto the surface of the green segment 106 or silicon may be transferred to the preform in the molten state using a porous carbon wick. Other MI processes, as well as other infiltration processes, may also be used. Further, it will be appreciated that heating the green segment 106 while in contact with a source of silicon may include heating the entire assembly 116 to a certain temperature at a certain pressure, e.g., in a furnace 118 as shown in FIG. 3.

As shown at (D) in FIG. 2, once the infiltration process is complete (e.g., after the assembly 116 has been heated to a threshold temperature at a certain pressure for a pre-determined period of time), the green segment 106, barrier segment 108, and infiltrated segment 100' are joined together as modified composite component 122. Those of ordinary skill in the art will appreciate the range of temperatures, pressures, and heating times, as well as other variables, that are acceptable for the selected infiltration process, such as a MI or chemical vapor infiltration process.

Thus, modifying an existing, infiltrated composite component 100 with green composite material may include a subsequent infiltration. When a subsequent infiltration is performed to restructure, repair, rebuild, densify, strengthen, enlarge, or otherwise modify the original infiltrated composite component 100, which was itself formed through a process including infiltration, loss or reflow of silicon from a previously infiltrated segment 100' of the composite component to the new, green segment 106 could occur. However, with the barrier segment 108 disposed between the infiltrated segment 100' and the green segment 106, loss of silicon phase from the infiltrated segment 100' can be avoided. Accordingly, silicon may be added during densification of the newly formed CMC green segment 106 during an infiltration process by adding exogenous silicon, not by siphoning silicon off of the original CMC component 100, which retains its silicon phase.

Figure 4:
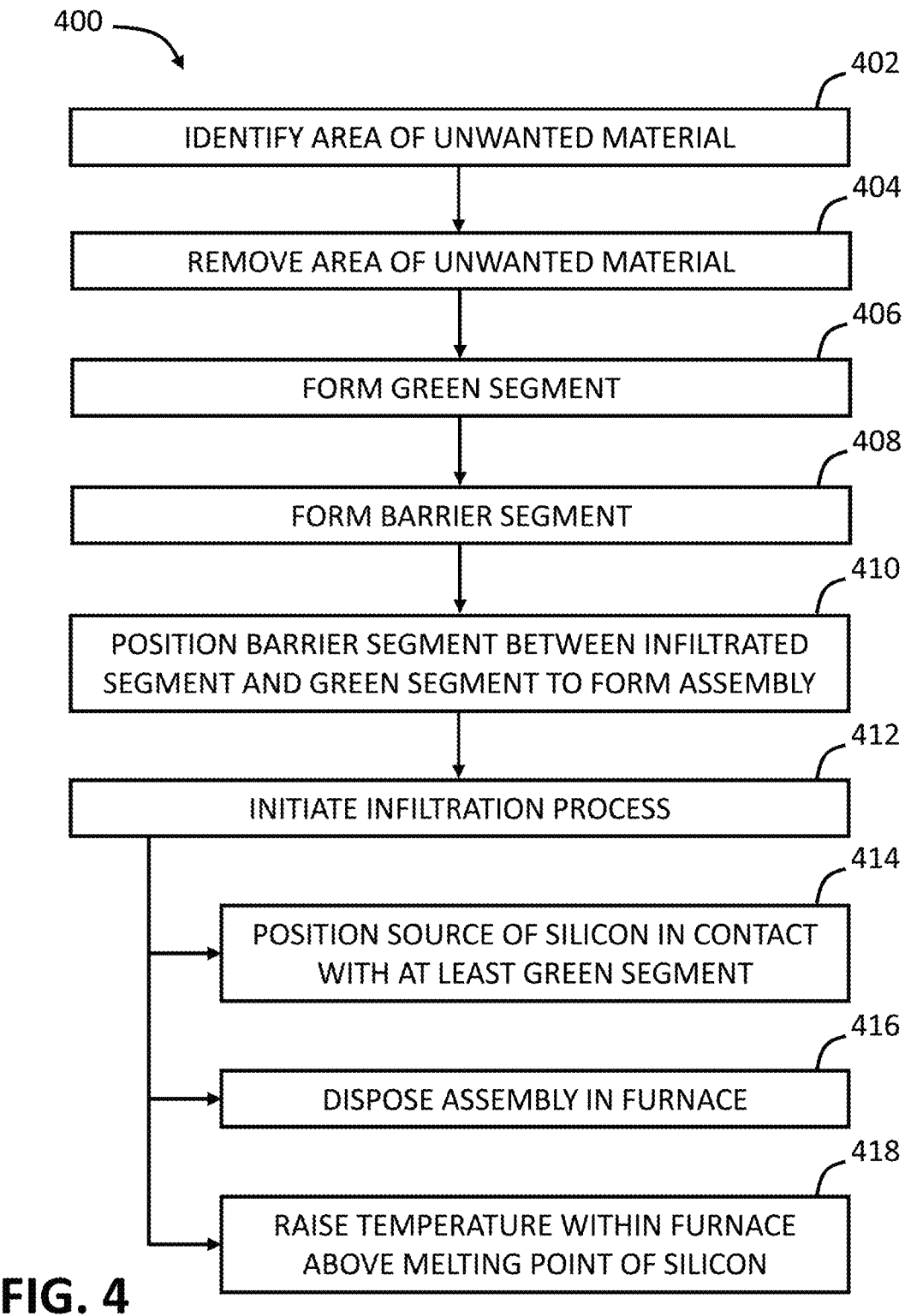
FIG. 4 provides a flow diagram illustrating a method for modifying a composite component.

As will be understood from the foregoing discussion, the present subject matter includes various methods for modifying a composite component, such as to repair or otherwise modify an existing, already infiltrated composite component. FIG. 4 illustrates a method 400 for modifying a composite component 100. As shown in FIG. 4, the method 400 optionally includes (402) identifying an area 102 of unwanted material and (404) removing the area 102 of unwanted material. For example, as described above, the composite component 100 may be damaged and to repair the composite component 100, the damaged portion may be removed and replaced with new material, i.e., a green segment 106 that is infiltrated as part of joining the green segment 106 to an infiltrated segment 100' of the composite component 100. Thus, in some embodiments, the method 400 includes identifying the area 102 of damaged or unwanted material and removing the area 102 of damaged or unwanted material from composite component 100 in preparation for joining the green segment 106 to the composite component 100. However, in other embodiments, no damaged or unwanted area 102 is removed from the composite component 100 prior to joining the green segment 106 to the composite component 100, such that (402) and (404) may be omitted from method 400.

Referring still to FIG. 4, the method 400 may include (406) forming a green segment 106 and (408) forming a barrier segment 108. In some embodiments, the green segment 106 may comprise a plurality of composite plies 114, and the barrier segment 108 may comprise one or more composite plies 114. For instance, forming the green segment 106 as shown at (406) of method 400 may include forming the green segment 106 from a first plurality of composite plies 114. Further, forming the barrier segment 108 as shown at (408) of method 400 may include forming the barrier segment 108 from a second plurality of composite plies 114. The green segment 106 and barrier segment 108 may be formed in other ways as well, such as from other types of composite preforms. Moreover, it will be understood that, as described in greater detail above, the green segment 106 and the barrier segment 108 may be formed either as separate preforms (i.e., a preform defining the green segment 106 and a preform defining the barrier segment 108) or as a single preform comprising both the green segment 106 and the barrier segment 108.

The method 400 shown in FIG. 4 also includes (410) positioning a barrier segment 108 between the infiltrated segment 100' and the green segment 106 to form an assembly 116. The method 400 further includes (412) initiating an infiltration process. In at least some embodiments, initiating an infiltration process includes (414) positioning a source of silicon 120 in contact with at least the green segment 106, (416) disposing the assembly 116 and the source of silicon 120 in a furnace 118, and (418) raising a temperature within the furnace 118 above a melting point of silicon. It will be appreciated that (414) positioning the source of silicon 120 and (416) disposing the assembly 116 and the source of silicon 120 within the furnace 118 may be performed in the opposite order, i.e., the assembly 116 and the source of silicon 120 may be disposed in the furnace 118 and then the source of silicon 120 may be positioned in contact with at least the green segment 106 of the assembly 116.

As described herein, the present subject matter may utilize parameters such as particle size, residual silicon content, porosity, non-reactive and reactive infiltration, etc. of various components or component segments to determine, e.g., whether a barrier segment 108 can sufficiently slow, limit, hinder, and/or prevent silicon transport from previously infiltrated material to green, unfiltrated material during a subsequent infiltration process. It will be appreciated that various different methods and processes may be used to measure and/or quantify such parameters. For example, particle size or specific surface areas for a component or material may be measured by light scattering, microscopy, image analysis, or BET measurements. As other examples, residual silicon levels may be measured or assessed through microscopy, image analysis, x-ray diffraction, or chemical etching with elemental analysis. As further examples, gravimetric analysis may be adapted to measure porosity, and non-reactive infiltration and reactive infiltration measurements based on weight gain or infiltration front height may be used to gauge permeability.

Accordingly, as described herein, the present subject matter provides composite components and methods for modifying composite components. For example, the present subject matter provides a barrier segment that is positioned between an unfiltrated green segment and an existing infiltrated segment of an existing, already infiltrated composite component during an infiltration process, e.g., as part of modifying the existing, already infiltrated composite component to repair or otherwise modify the composite component. The barrier segment slows or prevents redistribution or migration of one or more constituents, such as silicon for CMC components, from the infiltrated segment to the green segment during a subsequent infiltration. The redistribution or migration of constituents from the infiltrated segment to the green segment could weaken the infiltrated segment of the assembly, such that the barrier segment helps preserve the integrity and strength of the existing infiltrated composite component. As described herein, the barrier segment may have a lower permeability, such as through a different microstructure, than the infiltrated segment, the green segment, or both the infiltrated segment and the green segment to help prevent flow from the infiltrated segment to the green segment. Further, the lower permeability of the barrier segment can take advantage of interfacial dynamics between the different segments of the assembly to slow or prevent flow from the infiltrated segment to the green segment without using different materials or chemical changes or treatments, which can lessen potential divergences between the existing infiltrated region and the new region (formed from the green segment) in the final component. Other advantages of the subject matter described herein also may be realized by those of ordinary skill in the art.

Further aspects of the disclosure are provided by the subject matter of the following clauses:

A method for modifying a composite component comprising positioning a barrier segment between an infiltrated segment of the composite component and a green segment to form an assembly; and initiating an infiltration process, wherein the barrier segment has a barrier segment permeability that is lower than an infiltrated segment permeability of the infiltrated segment, a green segment permeability of the green segment, or both the infiltrated segment permeability and the green segment permeability.

The method of any preceding clause, wherein a particle size distribution varies from the barrier segment to the green segment.

The method of any preceding clause, wherein the particle size distribution varies from smaller particles in the barrier segment to larger particles in the green segment.

The method of any preceding clause, wherein the green segment comprises the barrier segment.

The method of any preceding clause, wherein the green segment comprises a plurality of composite plies, at least one composite ply of the plurality of composite plies defining the barrier segment.

The method of any preceding clause, wherein the barrier segment defines an interface surface, the interface surface contacting the infiltrated segment.

The method of any preceding clause, wherein the composite component is a ceramic matrix composite (CMC) component, and wherein the infiltration process is a silicon infiltration process.

The method of any preceding clause, wherein the silicon infiltration process is a melt-infiltration process.

The method of any preceding clause, wherein initiating the infiltration process comprises positioning a source of silicon in contact with at least the green segment.

The method of any preceding clause, wherein initiating the infiltration process further comprises disposing the assembly and the source of silicon in a furnace and raising a temperature within the furnace above a melting point of silicon.

The method of any preceding clause, wherein the silicon infiltration process is a chemical vapor infiltration process.

The method of any preceding clause, wherein the barrier segment permeability is a reactive permeability such that the barrier segment permeability is lower when the barrier segment reacts during the infiltration process.

The method of any preceding clause, wherein the reactive permeability of the barrier segment is lower than a reactive permeability of the green segment.

The method of any preceding clause, wherein the reactive permeability of the barrier segment is lower than a reactive permeability of the infiltrated segment.

The method of any preceding clause, wherein the infiltrated segment was infiltrated prior to initiating the infiltration process such that initiating the infiltration process comprises initiating a second infiltration of the infiltrated segment.

The method of any preceding clause, further comprising identifying an area of unwanted material; and removing the area of unwanted material.

The method of any preceding clause, further comprising forming the green segment from a first plurality of composite plies; and forming the barrier segment from a second plurality of composite plies.

The method of any preceding clause, wherein the barrier segment permeability is one-half or less of the green segment permeability.

The method of any preceding clause, wherein a ratio of the green segment permeability to the barrier segment permeability is greater than 4:1.

The method of any preceding clause, wherein the ratio of the green segment permeability to the barrier segment permeability is scaled by a time scale factor $t_0/t_{process}$ that is a ratio of a time scale $t_0$ of silicon transport in the barrier segment to a cycle time $t_{process}$ of infiltration of the assembly.

The method of any preceding clause, wherein the barrier segment permeability is less than the green segment permeability as determined by the equation $$K_{barrier} < 0.5 K_{green} \frac{t_0}{t_{process}}.$$

The method of any preceding clause, wherein a median particle size of the barrier segment is less than a median particle size of the infiltrated segment, the green segment, or both the infiltrated segment and the green segment.

The method of any preceding clause, wherein a residual porosity of the barrier segment is less than a residual porosity of the infiltrated segment, the green segment, or both the infiltrated segment and the green segment.

The method of any preceding clause, wherein a mass fraction ratio of silicon carbide to carbon particles is increased in the barrier segment relative to the infiltrated segment to lower the residual porosity of the barrier segment compared to the residual porosity of the infiltrated segment.

The method of any preceding clause, wherein a mass fraction ratio of silicon carbide to carbon particles is increased in the barrier segment relative to the green segment to lower the residual porosity of the barrier segment compared to the residual porosity of the green segment.

The method of any preceding clause, wherein a mass fraction ratio of silicon carbide to carbon particles is increased in the barrier segment relative to the infiltrated segment and the green segment to lower the residual porosity of the barrier segment compared to the residual porosity of the infiltrated segment and residual porosity of the green segment.

A composite component comprising an infiltrated segment infiltrated with a molten material during a prior infiltration process; a green segment that is uninfiltrated; and a barrier segment having a microstructure different from the infiltrated segment, the green segment, or both the infiltrated segment and the green segment, wherein the microstructure of the barrier segment is configured to slow a flow of material between the infiltrated segment and the green segment during a subsequent infiltration process.

The composite component of any preceding clause, wherein the green segment comprises the barrier segment.

The composite component of any preceding clause, wherein the green segment is a layup of composite plies, and wherein the barrier segment is at least one composite ply of the layup of composite plies.

The composite component of any preceding clause, wherein the microstructure of the barrier segment lowers a barrier segment permeability of the barrier segment with respect to a green segment permeability of the green segment such that the barrier segment permeability is one-half or less of the green segment permeability.

A method for modifying a ceramic matrix composite (CMC) component comprising positioning a barrier segment between an infiltrated segment of the CMC component and a green segment; positioning a source of silicon in contact with the green segment; and initiating a melt infiltration process, wherein the barrier segment has a reactive permeability lower than a reactive permeability of the infiltrated segment, a reactive permeability of the green segment, or both the reactive permeability of the infiltrated segment and the reactive permeability of the green segment.

This written description uses examples to disclose embodiments of the disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for modifying a composite component, comprising:
    positioning a barrier segment between an infiltrated segment of the composite component and a green segment to form an assembly, wherein a particle size distribution varies from the barrier segment to the green segment; and
    initiating an infiltration process,
    wherein the barrier segment has a barrier segment permeability that is lower than an infiltrated segment permeability of the infiltrated segment, a green segment permeability of the green segment, or both the infiltrated segment permeability and the green segment permeability.

2. The method of claim 1, wherein the composite component is a ceramic matrix composite (CMC) component, and wherein the infiltration process is a silicon infiltration process.

3. The method of claim 2, wherein initiating the infiltration process comprises positioning a source of silicon in contact with at least the green segment.

4. The method of claim 3, wherein initiating the infiltration process further comprises disposing the assembly and the source of silicon in a furnace and raising a temperature within the furnace above a melting point of silicon.

5. The method of claim 2, wherein the silicon infiltration process is a melt-infiltration process.

6. The method of claim 1, wherein the particle size distribution varies from smaller particles in the barrier segment to larger particles in the green segment.

7. The method of claim 1, wherein the infiltrated segment was infiltrated prior to initiating the infiltration process such that initiating the infiltration process comprises initiating a second infiltration of the infiltrated segment.

8. The method of claim 1, wherein the barrier segment permeability is one-half or less of the green segment permeability.

9. A method for modifying a ceramic matrix composite (CMC) component, comprising:
    positioning a barrier segment between an infiltrated segment of the CMC component and a green segment, wherein a particle size distribution varies from the barrier segment to the green segment;
    positioning a source of silicon in contact with the green segment; and
    initiating a melt infiltration process,
    wherein the barrier segment has a reactive permeability lower than a reactive permeability of the infiltrated segment, a reactive permeability of the green segment, or both the reactive permeability of the infiltrated segment and the reactive permeability of the green segment.

10. The method of claim 9, wherein the melt infiltration process comprises positioning a source of silicon in contact with at least the green segment.

11. The method of claim 10, wherein initiating the melt infiltration process is performed within a furnace by raising a temperature within the furnace above a melting point of silicon.

12. The method of claim 9, wherein the particle size distribution varies from smaller particles in the barrier segment to larger particles in the green segment.

13. A method for modifying a composite component, comprising:
    positioning a barrier segment between an infiltrated segment of the composite component and a green segment to form an assembly, wherein the green segment comprises the barrier segment; and
    initiating an infiltration process,
    wherein the barrier segment has a barrier segment permeability that is lower than an infiltrated segment permeability of the infiltrated segment, a green segment permeability of the green segment, or both the infiltrated segment permeability and the green segment permeability.

14. The method of claim 13, wherein a particle size distribution varies from the barrier segment to the green segment.

15. The method of claim 13, wherein the barrier segment defines an interface surface, the interface surface contacting the infiltrated segment.

16. A method for modifying a composite component, comprising:
    positioning a barrier segment between an infiltrated segment of the composite component and a green segment to form an assembly; and
    initiating an infiltration process,
    wherein the barrier segment has a barrier segment permeability that is lower than an infiltrated segment permeability of the infiltrated segment, a green segment permeability of the green segment, or both the infiltrated segment permeability and the green segment permeability, and wherein the barrier segment permeability is a reactive permeability such that the barrier segment permeability is lower when the barrier segment reacts during the infiltration process.

17. The method of claim 16, wherein the reactive permeability of the barrier segment is lower than a reactive permeability of the green segment.

18. A method for modifying a composite component, comprising:
    identifying an area of unwanted material in an infiltrated segment;
    removing the area of unwanted material;

thereafter, positioning a barrier segment between the infiltrated segment of the composite component and a green segment to form an assembly; and initiating an infiltration process, wherein the barrier segment has a barrier segment permeability that is lower than an infiltrated segment permeability of the infiltrated segment, a green segment permeability of the green segment, or both the infiltrated segment permeability and the green segment permeability.

19. A method for modifying a composite component, comprising:

forming a green segment from a first plurality of composite plies;

forming a barrier segment from a second plurality of composite plies;

positioning the barrier segment between an infiltrated segment of the composite component and the green segment to form an assembly; and initiating an infiltration process, wherein the barrier segment has a barrier segment permeability that is lower than an infiltrated segment permeability of the infiltrated segment, a green segment permeability of the green segment, or both the infiltrated segment permeability and the green segment permeability.

* * * * *